United States Patent
Schwertfeger et al.

[11] Patent Number: 6,143,400
[45] Date of Patent: Nov. 7, 2000

[54] AEROGEL AND ADHESIVE-CONTAINING COMPOSITE, PROCESS FOR ITS PRODUCTION AND ITS USE

[75] Inventors: Fritz Schwertfeger, Frankfurt; Andreas Zimmerman, Griesheim; Johann Wonner, Offenbach; Frank Scholl, Oberursel; Marc Schmidt, Frankfurt, all of Germany

[73] Assignee: Hoechst Research & Technology Deutchland GmbH & Co. KG, Frankfurt, Germany

[21] Appl. No.: 09/029,140
[22] PCT Filed: Sep. 4, 1996
[86] PCT No.: PCT/EP96/03867
   § 371 Date: May 11, 1998
   § 102(e) Date: May 11, 1998
[87] PCT Pub. No.: WO97/10187
   PCT Pub. Date: Mar. 20, 1997

[30] Foreign Application Priority Data

Sep. 11, 1995 [DE] Germany .......................... 195 33 565
Jun. 7, 1996 [DE] Germany .......................... 196 22 865

[51] Int. Cl.[7] ....................................... B32B 5/00
[52] U.S. Cl. .................................. 428/304.4; 428/306.6; 428/312.6; 428/317.9; 428/338; 428/446; 252/313.2; 252/306; 252/315.2
[58] Field of Search ................................ 428/338, 446, 428/304.4, 306.6, 307.3, 312.6, 317.9; 252/313.2, 306, 315.2

[56] References Cited

U.S. PATENT DOCUMENTS 5,569,513  10/1996  Fidler et al. ........................ 428/35.6

FOREIGN PATENT DOCUMENTS

| 0672635 A1 | 9/1995 | European Pat. Off. . | |
| 2941606 | 4/1981 | Germany | B32B 7/02 |
| 2941606 A1 | 4/1981 | Germany . | |
| 4409309 A1 | 9/1995 | Germany . | |
| 4437424 A1 | 4/1996 | Germany . | |
| WO 96/15997 | 5/1996 | WIPO . | |

*Primary Examiner*—William Krynski
*Assistant Examiner*—Dawn L. Garrett
*Attorney, Agent, or Firm*—Frommer Lawrence & Haug LLP

[57] ABSTRACT

The present invention relates to a composite material that contains 5 to 97%-vol aerogel particles and at least one adhesive and that is characterised in that the diameter of the aerogel particles is smaller than 0.5 mm, a process for manufacturing this, and the use thereof.

22 Claims, No Drawings

AEROGEL AND ADHESIVE-CONTAINING COMPOSITE, PROCESS FOR ITS PRODUCTION AND ITS USE

The present invention relates to a new type of composite material, of any shape, which provides good thermal insulation, and which contains 5 to 97% aerogel particles and at least one adhesive, the diameter of the aerogel particles being smaller than 0.5 mm.

As a rule, conventional insulating materials that are based on polystyrene, polyolefins, and polyurethanes are manufactured by using foaming agents such as chlorofluorocarbons (CFC). The foaming agent that is entrained within the cells of the foam is what provides the good thermal insulation capability. Foaming agents of this kind constitute an environmental hazard because they gradually escape into the atmosphere.

Also known are moulded parts that contain duroplastic resins such as urea, melamine, and phenolformaldehyde resins or mixtures of such resins; these are then mixed with extenders such as wood powder, asbestos, and preferably cellulose, and optionally with slip agents such as zinc stearate, pigments such as titanium dioxide, softening agents such as glycerin, or o,p-toluolsulfonamide and/or acid or acid cleaving hardening accelerators, to form so-called moulding compounds that are hardened in presses by the application of pressures from 100 to 2500 bar at temperatures from 100 to 200° C. to form moulded parts (Kunststoffhandbuch 10 *"Duroplaste,"* [*Plastics Handbook* 10 *"Duroplasts"*], Publisher: Prof. Dr. Woebcken, 2nd Ed., 1988, Hanser Verlag, pp. 266–274). The resins can be used as powder resins in the so-called fused-mass process, or a liquid resins in the so-called liquid resin process. The composition of a typical moulding compound as defined by DIN 7708 Type 152 is as follows:

50%-wt melamine formaldehyde resin
35%-wt bleached sulphite cellulose
1%-wt slip additive, e.g., zinc stearate
10%-wt white pigment, e.g. lithopone
1%-wt hardening accelerator
3%-wt softener Standard sample parts obtained in accordance with DIN 7708 have densities between 1.5 and 2.0 $g/cm^3$ and thermal conductivities between 300 and 600 mW/m•K (Kunststoffhandbuch 10 *"Duroplaste,"* [*Plastics Handbook* 10 *"Duroplasts"*], Publisher: Prof. Dr. Woebcken, 2nd Ed., 1988, Hanser Verlag, pp. 269–270). This means that they are unsuitable for use as thermal insulation.

Because of their very low densities and high porosities aerogels, in particular those with porosities above 60% and densities of less than 0.6 $g/cm^3$, display extremely low thermal conductivity, and for this reason are used as thermal insulation, as described in EP-A-O 171 722.

However, their high porosity results in poor mechanical stability, both of the gel from which the aerogel is dried, and of the dried aerogel itself.

It is also known that aerogels have extremely low dielelectric constants with values between 1 and 2, depending on the density of the aerogel. For this reason, aerogels are destined for use in electrical applications such as for high-frequency applications (See C. W. Hrubesh et al., *Journal of Materials Research,* Vol. 8, No. 7, pp. 1736–1741).

In the broadest sense, i.e., when regarded as "gels with air as the dispersant," aerogels are manufactured by drying a suitable gel. When used in this sense, the term "aerogel" includes aerogels in the narrower sense, such as xerogels and cryogels. A gel is designated as an aerogel in the narrower sense if the liquid is removed from the gel at temperatures above the critical temperature and starting from pressures that are above the critical pressure. In contrast to this, if the liquid is removed from the gel non-critically, for example with the formation of a liquid-vapour boundary phase, then the resulting gel is, in many instances, referred to as xerogel. It should be noted that the gels according to the present invention are aerogels in the sense that they are gels with air as the dispersant.

The process that shapes the aerogel is concluded during the sol-gel transition. Once the solid gel structure has been formed, the external shape can only be changed by size reduction, for example, by pulverizing.

For many applications, however, it is necessary to use the aerogel in certain shapes. To this end, it is necessary to carry out a shaping stage after the production of the aerogel, which is to say, after it has been dried, and to do this without any essential change of the internal structure of the aerogel taking place with respect to the particular application.

EP-A-O 340 707 describes an insulating material with a density of 0.1 to 0.4 $g/cm^3$ that consists of at least 50%-vol silica aerogel particles with a diameter between 0.5 and 5 mm, that are joined to each other by at least one organic and/or inorganic binder.

Reaction adhesives, silicon-resin adhesives, fusion adhesives, and aqueous dispersion adhesives are disclosed as organic binders.

However, this means that the insulating materials that are manufactured are not of a unified appearance, which is a disadvantage for many applications. Furthermore, the range of relative grain sizes means that the moulded parts that are produced from the insulating material contain aerogel material that is not homogeneously distributed. This applies, in particular, if the smallest typical dimensions of the moulded parts, the thickness in the case of films or panels, is not very much greater than the typical diameter of the aerogel particles. An increased percentage of binders would be required, mainly in the edge areas, and this would then have a negative effect on thermal conductivity and the dielectric properties of the moulded parts, particularly on the surfaces thereof.

Especially thin layers (0.01 to 2.0 mm) that cannot be manufactured using the aerogel particles described above are required, in particular, for electronic applications.

Furthermore, in a moulded part of this insulating material, there would be areas of reduced mechanical stability on the surface, formed from aerogel material with diameters between 0.5 and 5 mm, and under mechanical loads these could ultimately lead to surface irregularities with diameters or depths of up to 5 mm because of destruction of the aerogels on the surface.

In addition, because of the coarseness of the aerogel, it is not possible to manufacture film-like thermal insulation parts with a thickness of less than 0.5 mm. However, thicker film layers suffer because of the aerogel particles that are relatively large in relation to the film thickness, since a higher proportion of binders will be required, mainly in the edge areas, and this has a negative effect on thermal conductivity and the electronic characteristics of the dried film or of the dried moulded part.

EP-A-O 340 707 also describes a process by which the aerogel particles can be coated and/or mixed with a binder and the compound so obtained hardened in a mould. Because of the great difference in the densities between the aerogel and the inorganic and/or organic binders and the size of the aerogel particles, the compound that has been mixed has a tendency to separate, i.e., it is unstable for the longer period of time that is required for application and storage. Because of this, shaping can proceed only on the basis of relatively rapid hardening of the mixed compound in an all-enclosing mould.

Furthermore, it is not a simple matter to manufacture such insulating materials with only a small proportion of liquid since, when using the process described in EP-A-O 340 707, because of their low mechanical strength, the aerogel particles can be easily destroyed by shearing processes when they are being mixed.

For this reason, it is the task of the present invention to describe a composite material that is based on aerogels, which has a low thermal conductivity and a high level of mechanical strength, and which is also free of organic foaming agents.

This problem has been solved by a composite material that contains 5 to 97%-vol of aerogel particles and at least one adhesive, and that is characterised in that the diameter of the aerogel particles is smaller than 0.5 mm.

The adhesive or adhesives form a matrix that binds the aerogel particles or encloses them, and extends throughout the whole of the composite material as a continuous phase.

Given a content of aerogel particles that is significantly less than 5%-vol in the overall composition, because of the low proportion of aerogel particles in the overall composition, their positive properties would be lost to a great extent. Such a composition would no longer be of low density and thermal conductivity.

A content of aerogel particles that is significantly above 97%-vol would lead to an adhesive content of less than 3%-vol. In this case, the proportion would be too low to ensure adequate binding of the aerogel particles to each other and adequate mechanical compressive resistance and flexural strength.

It is advantageous if the proportion of aerogel particles is in the range from 10 to 97%-vol, especially in the range from 20 to 95%-vol, and in particular in the range from 40 to 95%-vol.

According to the present invention, the diameter of the aerogel particles is less than 0.5 mm, and preferably less than 0.2 mm. For electronic applications, the diameter can be much smaller, although it is advantageously greater than 1 μm. The particle diameter relates to the average diameter of the individual aerogel particles, since—as a result of manufacturing methods, which may be by milling, for example—the particles do not necessarily have to be spherical.

The use of smaller aerogel particles results in a more homogeneous distribution in the overall composition, which leads to the fact that the composite material has an almost uniform, low thermal conductivity and dielectric constants at all points, but in particular on its surfaces.

In addition, given an equal proportion of aerogel, small aerogel particles result in improved mechanical stability with respect to the formation of breaks and cracks, since no stresses that are sufficiently great can build up locally when the material is under load.

A particularly large proportion of aerogel particles in the composite material can be achieved by bimodal distribution of the grain sizes.

Suitable aerogels for the composition according to the present invention are those based on metallic oxides, which are suitable for the sol-gel technique (C. J. Brinker, G. W. Scherer, *Sol-Gel Science.* 1990, Chaps. 2 and 3), for example, Si or Al compounds or such as those based on organic substances that are suitable for the sol-gel technique, such as melamine-formaldehyde condensates (U.S. Pat. No. 5,086,085) or resocinformaldehyde condensates (U.S. Pat. No. 873,218). They can also be based on mixtures of the above-cited materials. It is preferred that aerogels containing Si compounds, in particular $SiO_2$ aerogels, and especially $SiO_2$ xerogels, be used. The aerogel can contain infrared opacifiers, such as soot, titanium dioxide, iron oxides, or zirconium dioxide, as well as mixtures of these, in order to reduce the radiation contribution to thermal conductivity.

In a preferred embodiment, the aerogel particles have permanently hydrophobic surface groups. Suitable groups for permanent hydrophobisation are, for example, silyl groups of the general formula $—Si(R)_n$, wherein n=1, 2, 3, preferably tri-substituted silyl groups, and the R radicals, in general independently of each other, are each a hydrogen atom or a non-reactive, organic, linear, branched, cyclic, aromatic or heteroaromatic radical, preferably $C_1$–$C_{18}$-alkyl or $C_6$–$C_{14}$-aryl, especially $C_1$–$C_6$-alkyl, cyclohexyl, or phenyl, in particular methyl or ethyl. Particularly effective for the permanent hydrophobisation of the aerogel is the use of trimethylsilyl groups. These groups can be incorporated as described in WO 94/25149, or they can be brought about by gas-phase reaction between the aerogel and, for example, an activated trialkylsilane derivative such as a clhlortrialkylsilane or a hexaalkyldisilacane (compare R. Iler, *The Chemistry of Silica,* Wiley & Sons, 1979). Compared to OH groups, the hydrophobic surface groups produced in this way reduce the dielectric loss factor and the dielectric constants. Depending on atmospheric humidity, aerogel particles with hydrophobic surface groups can adsorb water, and this means that dielectric constants and dielectric loss factors can vary with atmospheric humidity. Very often, this is undesirable for electronic applications. The use of aerogel particles with hydrophobic surface groups prevents this variation, since no water is adsorbed. In addition, the radicals are also selected on the basis of typical application temperatures.

If aerogel particles with hydrophobic surface groups are used, if very small particle diameters are used, one obtains a hydrophobic composite material, since the hydrophobic aerogel is homogeneous and very finally divided. In principle, however, all aerogels are suitable.

Furthermore, the thermal conductivity of the aerogels decreases as porosity increases and density decreases. For this reason, aerogels with porosities of greater than 60% and densities of less than 0.6 $g/cm^3$ are especially preferred. In particular, aerogels with densities of less than 0.4 $g/cm^3$ are preferred.

In principle, all known adhesives are suitable for manufacturing the composite materials according to the present invention; in the present invention, an adhesive is understood to be a non-aqueous binder. Non-aqueous binders in the sense of the present application are solvents or mixtures of solvents that contain less than 50%-wt water. The adhesive is used either in liquid form, i.e., as a liquid, fused material, solution, dispersion, or suspension, or as a solid powder.

Unary adhesives that set physically or are chemically hardened, as well as chemically hardened binary adhesives can be used.

Suitable unary adhesives that set physically are, for example, fusion adhesives, such as ethylenevinylacetate copolymers and polyamides, polyethylene waxes, dispersion adhesives, solvent adhesives, and plastisols.

Suitable chemically hardened unary adhesives are, for example, thermally hardened epoxy resins, formaldehyde condensates, polyimides, polybenzimidazols cyanacrylates, polyvinylalcohols, polyvinylbutyrals, anaerobic adhesives, moisture hardened silicones, well as photo- and UV hardened systems, with polyvinylbutyrals and/or polyvinylalcohols, or phenol, resorcin, urea, and melamineformaldehyde resins and mixtures thereof being preferred. Suitable chemically hardened binary adhesives are methacrylates, binary silicones, cold hardened epoxy resins, and cold hardened polyurethanes.

The manufacture and use of phenol, resorcin, urea, and melamineformaldehyde resins is familiar and described, for example, in *Kunststoffhandbuch* 10 *"Durplaste,"* [*Plastics Handbook* 10 *"Duroplasts"*], Publisher: Prof. Dr. Woebcken, 2nd Ed., 1988.

In general, the adhesives are used at a rate of 3 to 95%-vol of the composite material, preferably at a rate of 3 to 90%-vol, and in particular at a rate of 5 to 80%-vol and, more especially, at a rate of 5 to 60%-vol. The choice of the binder is based on the mechanical and thermal properties that are desired for the composite material.

In addition, when selecting adhesives, one usually selects products that do not essentially penetrate into the interior of the porous aerogel particles. Penetration of the adhesive into the interior of the aerogel particles can be influenced by controlling the temperature and the set-up time as well as by selection of the adhesive.

In order to reduce the radiation component of thermal conductivity, the composite material can contain infrared opaciters such as soot, titanium dioxide, iron oxides, or zirconium dioxide, as well as mixtures of these, which is particularly advantageous for applications at high temperatures.

In addition, in order to improve its mechanical properties, the composite material can also contain up to 85%-vol of extenders, such as wood powder, asbestos, and, preferably, cellulose. It is preferred that the proportion of extenders be less than 70% and in particular in the range from 0 to 50%-vol relative to the composite material.

The composite material can also contain at least one fibre material. The addition of fibres is particularly advantageous for thermal applications and with respect to the formation of cracks and resistance to breakage.

In contrast to a material that consists solely of aerogel particles that are connected by their surfaces or embedded in a matrix of adhesive, most surprisingly, even small proportions of fibres by volume can result in significant mechanical strengthening given an equal proportion of adhesive by volume, since they assume large part of the load. If a greater volume of fibres is used with only a small amount of adhesive, it is possible to obtain a porous material in which the fibres that are connected by the adhesive form a mechanically stable structure within which the aerogel particles are embedded. The air pores that then result lead to a higher level of porosity, and thus to improved acoustic damping.

Natural fibres such as cellulose, cotton, or flax fibres, as well as synthetic fibres, can be used as the fibre material; with respect to the synthetic fibres, it is possible to use inorganic fibres such as glass fibres, mineral fibres, silicon carbide fibres or carbon fibres; and to use polyester fibres, polyamide fibres, or polyaramid fibres as organic fibres. The fibres can be new, or waste material such as shredded glass-fibre waste or waste rags. The fibres can also be coated, as in the case of polyester fibres that are metallized with aluminum.

The fibres can be straight or crimped, and be in the form of individual fibres, wadding, or a non-woven or woven fibre material. Non-woven fibre material and/or textiles can be contained in the binder in the form of a cohesive whole and/or in the form of a number of smaller pieces.

The fibres can be round, trilobal, pentalobal, octalobal, in the form of strips, or be shaped like fir trees, dumb bells, or otherwise. Hollow fibres can also be used.

In general, fibres with diameters that are between 0.1 $\mu$m and 5 mm are used. Typically, in the case of fixed proportions of fibres by volume, the use of smaller diameters results in composite materials that are more resistant to breakage.

The diameter of the fibres that are used in the composite material should preferably be smaller than the mean diameter of the aerogel particles, so that a high proportion of aerogel is bound into the binder. The selection of very fine fibres makes the composite material slightly flexible.

There are no restrictions on the lengths of the fibres. Preferably, however, the lengths of the fibres should be greater than the mean diameter of the aerogel particles.

The mechanical strength of the composite material can be affected by the length and distribution of the fibres within the material. For this reason, for the purposes of this particular application, it is preferred that fibres that are between 0.5 and 10 centimeters long be used.

Mixtures of the above fibre types can also be used.

The stability and the thermal conductivity of the composite material increase as the proportion of fibres increases. In order to avoid any significant increase of thermal conductivity being caused by the fibres that are added, the volumetric proportion of the fibres should preferably by between 0.1 and 40%-vol, and in particular in the range between 0.1 and 15%-vol.

In addition, the thermal conductivity of the fibres should preferably be <1 W/mK.

Greater mechanical strength can be achieved and the radiation contribution to thermal conductivity can be reduced by appropriate selection of the fibre diameter and/or the fibre material. To this end, the fibre diameter should be as follows:

a) in the case of non-metallized fibres, preferably 0.1 to 30 $\mu$m, b) in the case of metallized fibres, preferably 0.1 to 20 $\mu$m.

The radiation contribution to thermal conductivity can be further reduced if blackened fibre, such as polyester fibres that have been blackened with soot or pure carbon fibres, are used.

In order to enhance the way in which they bind into the matrix, the fibres can be coated with sizing or coupling agents, as is typically done in the case of glass fibres.

Because of the adhesive, the fibres and aerogels are cemented to each other or together, or the adhesive serves as matrix material within which the fibres and the aerogel particles are embedded.

In addition, small quantities of slip agent such as zinc stearate, pigments such as titanium dioxide, softeners such as glycerine and o,p-toluol sulfonamide and/or acids or acid-cleaving hardening accelerator can be contained in the composite material.

If, because of the adhesive that is used and/or because of hydrophilic aerogel particles, the composite material should be hydrophilic, optional secondary processing can follow in which hydrophobic properties are imparted to the composite material. All the substances familiar to the practitioner skilled in the art and known by him to be suitable for this purpose can be used to do this; these substances, such as paints, films, silylating agents, silicon resins, and inorganic and organic binders impart a hydrophobic surface to the composite material.

In addition, so-called coupling agents can be used during the adhesion process. These ensure that there is better contact between the adhesive and the surface of the aerogel particles, and they can also create a firm bond both with the aerogel particles and with the adhesive.

The moulded parts according to the present invention, which are manufactured from aerogel granulate, in general in the form of panels that contain the composite material according to the present invention, are preferably of a density that is lower than 0.6 g/cm$^3$ and preferably are of a thermal conductivity of less than 100 mW/m•K. It is preferred that the thermal conductivity be less than 50 mW/m•K and in particular be in the range from 20 to 40 mW/m•k.

The fire rating of the composite material obtained after drying is determined by the fire rating of the aerogel and of the adhesive and, optionally, by that of the fibre material. In order to arrive at the most favourable fire rating for the composite material (difficult to ignite or non-flammable), adhesives that are difficult to ignite are used; such adhesives can be, for example, urea and melamineformaldehyde resins, silicon resin adhesives, polyimide and polybenzimidazol resins, as well as fibres of non-flammable material such as mineral, glass, or SiC fibres.

In order to manufacture the composite materials according to the present invention, the aerogel particles are connected to each other by means of at least one adhesive. Connection of the individual particles to each other can be effected point by point, as it were. Such a surface coating can be achieved by spraying the aerogel particles with the adhesive, for example. The coated particles are then placed in a mould, and then hardened within the mould.

In one preferred embodiment, the spaces between the individual particles are also filled, either partially or completely, with adhesive. Such a composition can be produced in that one mixes the aerogel particles and, optionally, the fibres with the adhesive.

The mixing process can be carried out using any method. On the one hand, it is possible to introduce the components, of which there are at least two, into the mixer simultaneously or, on the other hand, one of the components can be introduced first, with the other(s) being added subsequently.

There are no restrictions on the type of mixture that can be used for the mixing process. Any mixer known to the practitioner skilled in the art can be used for this purpose.

The mixing process is continued until such time as the aerogel particles are evenly distributed within the composition, or very nearly so. When this is done, the mixing process can be regulated by the duration of the mixing process as well as by the speed of the mixer.

This is followed by shaping and hardening the mixture in the mould, which will be done by heating and/or evaporating the solvent and/or dispersant that has been used or, if fusion adhesives are used, by cooling to a temperature below the fusion temperature of the adhesive, depending on the type of adhesive that has been used.

In one preferred embodiment, the mixture is compressed. When this is done, the practitioner skilled in the art can select the press and the press tool best suited for the particular application. The use of vacuum presses is particularly advantageous because of the large amount of air in press compound that contains aerogels. In a preferred embodiment, the moulding compound that contains the aerogel is compressed to form panels. In order to avoid the compound baking onto the pressure ram, the mixture that contains the aerogel and which is to be compressed can be separated from the pressure ram by release paper. The mechanical strength of the panels that contain the aerogel can be enhanced by laminating mesh fabrics, non-woven fabrics, or papers onto the surface of the panel. These mesh textiles, non-woven fabrics, or papers can be applied to the panels that contain aerogel subsequently, in which case the mesh fabrics, non-woven textiles, or papers are previously impregnated with melamine resins, and then bonded to the surface of the panel in a heated press when under pressure. In addition, in one preferred embodiment, this can be done by laying up the mesh textiles, non-woven textiles, and paper, optionally previously impregnated with melamine resin, in the press mould and applying them to the press compound that contains the aerogel and which is to be pressed and then subjecting them to pressure and elevated temperatures to form a composite panel that contains aerogels.

Depending on the adhesive that is used, in any moulds, the pressing generally takes place at pressures from 1 to 1000 bar and at temperatures from 0 to 300° C.

In the case of the preferred phenol, resorcin, urea, and melamineformaldehyde resins, pressing preferably takes place at pressures from 5 to 50 bar, especially at 10 to 20 bar, and at temperatures preferably from 100 to 200° C., especially at 130 to 190° C., and in particular between 150 and 175° C.

Because of their low level of thermal conductivity, after hardening, the composite materials according to the present invention are suitable for use as thermal-insulation materials.

The present invention will be described in greater detail below on the basis of examples of embodiments without, however, being restricted to these.

The hydrophobic aerogels were manufactured analgously to the process described in DE-A-43 42 548.

The thermal conductivity of the aerogel granulates was measured by a hot-wire method (see, for example, O. Nielsson, G. Rüschenpöhler, J. Groβ, J. Fricke, *High Temperatures— High Pressures,* Vol. 21, pp. 267–274 (1989)). The thermal conductivity of the moulded parts was measured in accordance with DIN 52612.

EXAMPLE 1

Moulded part of aerogel and melamineformaldehyde resin 20 g hydrophobic aerogel (94%-vol) and 5 g Madurit® MW 909 melamineformaldehyde powder resin (6%-vol) are thoroughly mixed. The hydrophobic aerogel granulate is of a grain size that ranges from 50 to 250 μm and an apparent settled density [powder density] of 0.1 g/cm$^3$, a BET surface of 570 m$^2$/g and a thermal conductivity of 15.7 mW/mK. The bottom of the press mould, with a base measurement of 12×12 cm, is lined with release paper. The moulding material, which contains the aerogel, is applied evenly to this, and the whole is then covered with release paper. A pressure of 10 bar is applied at 170° C. for 30 minutes. The moulded part obtained in this way has a density of 0.32 g/cm$^3$ and a thermal conductivity of 30 mW/m•K.

EXAMPLE 2

A moulded body of aerogel, melamineformaldehyde resin and slip additive 20 g hydrophobic aerogel (93%-vol), 5 g Madurit® MW 909 melamineformaldehyde powder resin (6%-vol), and 1 g zinc stearate (1%-vol) are thoroughly mixed and pressed for 30 minutes at a pressure of 10 bar and at a temperature of 170° C. in a press having a base area of 12 cm×12 cm. The hydrophobic aerogel granulate has a grain size ranging from 50 to 250 μm, an apparent settled density of 0.117 g/cm$^3$, a BET surface of 540 m$^2$/g, and a thermal conductivity of 18.4 mW/mK. The moulded part obtained in this way has a density of 0.33 g/cm$^3$ and a thermal conductivity of 33 mW/m•K.

EXAMPLE 3
Moulded part of aerogel, melamine-fomaldehyde resin and extender 140 g hydrophobic aerogel granulate as used in Example 2 (77%-vol), 75 g Madurit® MW 909 melamineformaldehyde powder resin (10%-vol), and 17.5 g Type 402-2B microcellulose manufactured by Microtechnik, Miltenberg am Main (13%-vol) are thoroughly mixed. The bottom of the mould, with a base area of 30 cm×30 cm, is covered with release paper, and a screen textile with a mesh size of 5 mm is laid upon this. The moulding material that contains the aerogel is applied evenly on top of this, covered with a screen textile with a mesh size of 5 mm and the whole is then covered with release paper. It is then heated at a temperature of 160° C. and a pressure of 20 bar for 9 minutes, and pressed during subsequent cooling. The moulded body, which is in the form of a stable panel, has a density of 0.38 g/cm$^3$ and a thermal conductivity of 37 mW/m•K.

EXAMPLE 4
Moulded part of aerogel, melamineformaldehyde resin and extender, and various fibrous materials and/or extenders 140 g of a hydrophobic SiO$_2$ aerogel as used in Example 2, 75 g, Madurit® MW 909 melamineformaldehyde powder resin and the fibrous materials and/extenders shown in Table 1 are thoroughly mixed and pressed in a press having a base area of 30 cm×30 cm, at a temperature of 160° C. at a pressure of 10 to 20 bar for 10 minutes. The densities of the panels so obtained are also set out in Table 1.

TABLE 1

Composition of the pressing materials in %-vol and the densities of the moulded bodies obtained therefrom

| No. | Aerogel [%-vol] | Madurit MW 909 [%-vol] | Fibrous Material [%-vol] | Extender [%-vol] | Density [g/cm$^3$] |
|---|---|---|---|---|---|
| A | 77% | 10% | Rockwool 13% | | 0.31 |
| B | 77% | 10% | Textile fibres 13% | | 0.36 |
| C | 77% | 10% | Glass fibres 13% | | 0.38 |
| D | 83% | 11% | | Microcellulose 6% | 0.39 |
| E | 88% | 11% | Glass fibres 1% | | 0.36 |
| F | 78% | 11% | Rockwool 1% | | 0.33 |
| G | 78% | 11% | | Microcellulose 11% | 0.32 |
| H | 77% | 10.5% | Glass fibres 0.5% | Microcellulose 12% | 0.32 |
| I | 77% | 10.7% | Glass fibres 0.5% | Microcellulose 12% | 0.4 |

COMPARATIVE EXAMPLE
Moulded body of melamineformaldehyde resin and silicic acid 90 g Madurit® MW 396 melamineformaldehyde powder resin was thoroughly mixed with 100 g Perkasil® KS 404, 30 g microcellulose, and 2.5 g zinc stearate, and pressed for 4 minutes at a pressure of 270 bar and at a temperature of 155° C. in a press with a base area of 12 cm×12 cm. The moulded body obtained in this way has a density of 1.37 g/cm$^3$ and a thermal conductivity of 150 mW/m•K.

EXAMPLE 5
Moulded part of aerogel and polyvinyl alcohol

90%-wt hydrophobic aerogel granulate and 10%-wt of a polyvinyl alcohol solution were thoroughly mixed. The hyrophobic aerogel granulate has a grain size of smaller than 500 μm, an apparent settled density of 75 kg/m$^3$, a BET surface of 610 m$^2$/g and a thermal conductivity of 15 mW/(m•K). The polyvinyl alcohol solution consists of 10%-wt Type 40-88 Mowiol® and 90%-wt ethanol.

The bottom of the press mould, with a base area of 12 cm×12 cm, is covered with release paper and the moulding compound that contains the aerogel is applied to this in an even coating. A pressure of 70 bar is applied at ambient temperature for 2 minutes, and it is then dried.

The moulded part obtained in this way has a thermal conductivity of 24 mW/(m•K)

EXAMPLE 6
Moulded part of aerogel and polyethylene wax

60%-wt of hydrophobic aerogel granulate as described in Example 5, and 40%-wt Ceridust® 130 polyethylene wax powder are thoroughly mixed.

The bottom of the mould, with a base area of 12 cm×12 cm is covered with release paper, and the moulding material, which contains the aerogel, is applied evenly to this, and the whole is then covered with release paper. A pressure of 70 bar is applied at 170° C. for 30 minutes. The moulded part obtained in this way has a thermal conductivity of 25 mW/(m•K).

EXAMPLE 7
Moulded part of aerogel and polyethylene wax

50%-wt of hydrophobic aerogel granulate as described in Example 5, and 50%-wt Hoechst-Wachs PE 520 polyethylene wax are thoroughly mixed.

The bottom of the press mould, with a base area of 12 cm×12 cm, is covered with release paper. The moulding material, which contains the aerogel, is applied evenly to this, and the whole is then covered with release paper. A pressure of 70 bar is applied at 180° C. for 30 minutes.

The moulded part obtained in this way has a thermal conductivity of 28 mW/(m•K)

EXAMPLE 8
Moulded part of aerogel and polyvinylbutyral

80%-vol hydrophobic aerogel granulate and 20%-vol Mowital® (Polymer F) polyvinylbutyral powder are thoroughly mixed. The hydrophobic aerogel granulate has a grain size of smaller than 500 μm and an apparent settled density of 75 kg/m$^3$, a BET surface of 640 m$^2$/g and a thermal conductivity of 11 mW(m•K).

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 361 kg/m$^3$ and a thermal conductivity of 33 mW/(m•K).

EXAMPLE 9
Moulded part of aerogel and polyvinylbutyral

90%-vol hydrophobic aerogel granulate as described in Example 8 and 10%-vol Mowital® (Polymer F) polyvinylbutyral powder is thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 335 kg/cm$^3$ and a thermal conductivity of 24 mW/(m•K).

EXAMPLE 10

Moulded part of aerogel and polyvinylbutyral

95%-vol hydrophobic aerogel granulate as described in Example 8 and 5%-vol Mowital® (Polymer F) polyvinylbutyral powder are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 246 kg/in$^3$ and a thermal conductivity of 19 mW/(m•K).

EXAMPLE 11

Moulded part of aerogel, polyvinylbutyral, and fibres

90%-vol hydrophobic aerogel granulate as described in Example 8 and 8%-vol Mowital® (Polymer F) polyvinylbutyral powder and 2%-vol Trevira® high-strength fibres are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 269 kg/m$^3$ and a thermal conductivity of 20 mW/(m•K).

EXAMPLE 12

Moulded part of aerogel, polyvinylbutyral, and recycling fibres

80%-vol hydrophobic aerogel granulate as described in Example 8, 10%-vol Mowital® (Polymer F) polyvinylbutyral powder and 10%-vol of coarsely shredded polyester fibre remnants as the recycling fibres are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 282 kg/m$^3$ and a thermal conductivity of 25 mW/(m•K).

EXAMPLE 13

Moulded part of aerogel, polyvinylbutyral, and film scraps

80%-vol hydrophobic aerogel granulate as described in Example 8 and 10%-vol Mowital® (Polymer F) polyvinylbutyral powder and 10%-vol of 14 $\mu$m-thick polyester film scraps are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 355 kg/m$^3$ and a thermal conductivity of 26 mW/(m•K).

What is claimed is:

1. A composite material that contains 5 to 97%-vol aerogel particles and at least one organic adhesive, characterised in that the diameter of the aerogel particles is greater than 1 $\mu$m and smaller than 0.5 mm, said material is free of organic foaming agents.

2. A composite material as defined in claim 1, characterized that the proportion of aerogel particles is in the range from 20 to 95%-vol.

3. A composite material as defined in claim 1, characterised in that the diameter of the aerogel particles is less than 0.2 mm.

4. A composite material as defined in claim 1, characterised in that the grain sizes of the aerogel particles are in a bimodal distribution.

5. A composite material as defined in claim 1, characterised in that the aerogel is an SiO$_2$ gel.

6. A composite material as defined in claim 1, characterised in that the aerogel particles have permanently hydrophobic surface groups.

7. A composite material as defined in claim 1, characterised in that the aerogel particles are of porosities above 60% and densities of less than 0.6 g/cm$^3$.

8. A composite material as defined in claim 1, characterised in that the aerogel particles and/or the adhesive contain at least one infrared opacifier.

9. A composite material as defined in claim 1, characterised in that the composite material contains fibres.

10. A composite material as defined in claim 9, characterised in that the proportion of fibres is in the range from 0.1 to 40%-vol.

11. A composite material as defined in claim 1, characterised in that the composite material contains extenders.

12. A composite material as defined in claim 1, characterised in that phenol, resorcin, urea, and melamineformaldehyde resins, as well as mixtures of these, are used as adhesive.

13. A composite material as defined in claim 1, characterised in that polyvinylbutyrals and/or polyvinylalcohols are used as adhesive.

14. A composite material as defined in claim 1, characterised in that it has a density of less than 0.6 g/cm$^3$ and a thermal conductivity of less than 100 mW/mK.

15. A composite material as defined in claim 1, characterized in that the composite material has at least a hydrophobic surface.

16. A process for manufacturing the composite material as defined in claim 1, characterised in that the aerogel particles are mixed with the adhesive, the mixture is shaped, and it is then hardened.

17. A process as defined in claim 16, characterised in that the mixture is compressed for purposes of shaping and/or hardening.

18. A process as defined in claim 17, characterised in that compression is effected at press pressures of 1 to 1000 bar and a t temperatures from 0 to 300° C.

19. Moulded part containing a composite material as defined in claim 1.

20. Moulded part consisting essentially of a composite material as defined in claim 1.

21. Moulded part as defined in claim 19, characterised in that it is in the form of a panel.

22. In a method of insulating a material, the improvement which comprises applying a composite material according to claim 1 to the material to be insulated.

* * * * *